United States Patent [19]

Phillips

[11] Patent Number: 5,314,200
[45] Date of Patent: May 24, 1994

[54] MULTI-PURPOSE TRAILER APPARATUS

[76] Inventor: Vern L. Phillips, 4609 W. 129th Street, Savage, MN 55738

[21] Appl. No.: 24,284

[22] Filed: Mar. 1, 1993

[51] Int. Cl.$^5$ .............................................. B62D 33/04
[52] U.S. Cl. .................................... 280/400; 296/158; 296/24.1; 296/181; 296/168
[58] Field of Search ...................... 280/400, 424, 7.14, 280/7.1, 19.1; 296/181, 182, 158, 168, 169, 175, 24.1, 24.2, 57.1, 157; 224/42.12, 42.2; D12/102, 103, 104, 101

[56] References Cited

U.S. PATENT DOCUMENTS

| 770,572 | 9/1904 | Gnatzig | 296/57.1 |
| 2,621,070 | 12/1952 | Crivella | 296/168 |
| 2,829,001 | 4/1958 | Leaphart | 296/57.1 |
| 3,053,224 | 9/1962 | Pierce | 296/24.2 |
| 3,193,321 | 7/1965 | Rose | 296/157 |
| 3,256,032 | 6/1966 | Jackson, Jr. | 296/169 |
| 3,480,320 | 11/1969 | Turner et al. | 296/57.1 |
| 3,574,388 | 4/1971 | Stone | 296/24.2 |
| 4,579,382 | 4/1986 | Lake | 296/181 |
| 4,854,631 | 8/1989 | Laursen | 296/168 |

FOREIGN PATENT DOCUMENTS

| 361631 | 4/1990 | European Pat. Off. | 224/42.2 |
| 2101537 | 1/1983 | United Kingdom | 296/181 |

Primary Examiner—Brian L. Johnson
Assistant Examiner—Kevin Hurley
Attorney, Agent, or Firm—Leon Gilden

[57] ABSTRACT

A trailer arranged for transport and for use as a dwelling is provided to include a framework having a housing mounted thereon, with the housing including a door assembly extending between the side walls of the housing pivotally mounted to the framework to permit loading of components within the trailer structure. The roof of the housing is arranged for extension relative to the housing for use as a dwelling.

1 Claim, 4 Drawing Sheets

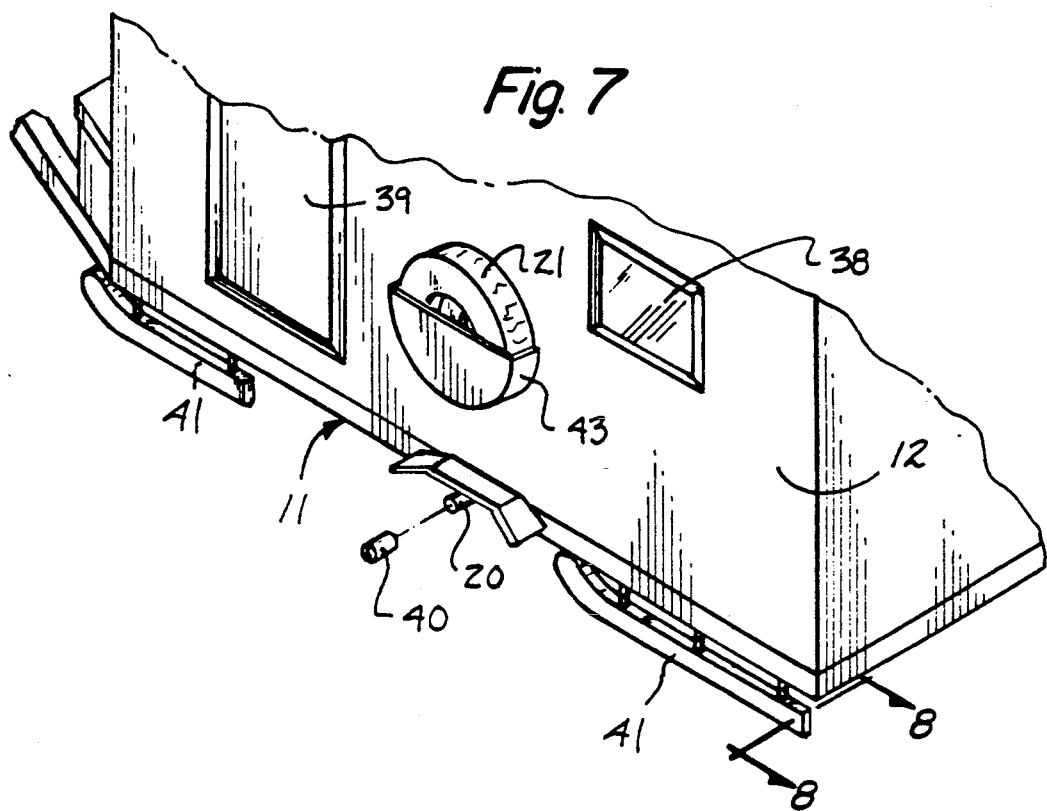
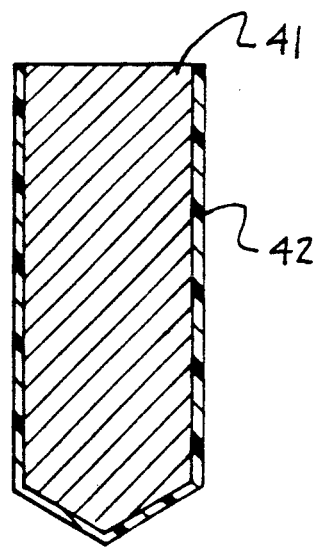

MULTI-PURPOSE TRAILER APPARATUS

BACKGROUND OF THE INVENTION

1. Field of the Invention

The field of invention relates to trailer apparatus, and more specifically pertains to a new and improved multi-purpose trailer apparatus wherein the same is arranged for use as a temporary dwelling and for transport of articles therewithin.

2. Description of the Prior Art

Enclosed trailer structure of various types have been available in the prior art, wherein trailer structure for specialized purposes such as towing of snowmobiles is exemplified in the U.S. Pat. Nos. 3,923,335; 4,222,698; 4,014,444; and 3,658,200.

The instant invention attempts to overcome deficiencies of the prior art by providing for a trailer structure arranged for the ease of transport of snowmobile structure, as well as for the use of the trailer structure as a temporary dwelling and in this respect, the present invention substantially fulfills this need.

SUMMARY OF THE INVENTION

In view of the foregoing disadvantages inherent in the known types of trailer apparatus now present in the prior art, the present invention provides a multi-purpose trailer apparatus wherein the same is arranged for the enclosed transport of snowmobiles and the like, as well as for the use of the trailer structure as a temporary dwelling. As such, the general purpose of the present invention, which will be described subsequently in greater detail, is to provide a new and improved multi-purpose trailer apparatus which has all the advantages of the prior art trailer apparatus and none of the disadvantages.

To attain this, the present invention provides a trailer arranged for transport and for use as a dwelling, to include a framework having a housing mounted thereon, with the housing including a door assembly extending between the side walls of the housing pivotally mounted to the framework to permit loading of components within the trailer structure. The roof of the housing is arranged for extension relative to the housing for use as a dwelling.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multi-purpose trailer apparatus which has all the advantages of the prior art trailer apparatus and none of the disadvantages.

It is another object of the present invention to provide a new and improved multi-purpose trailer apparatus which may be easily and efficiently manufactured and marketed.

It is a further object of the present invention to provide a new and improved multi-purpose trailer apparatus which is of a durable and reliable construction.

An even further object of the present invention is to provide a new and improved multi-purpose trailer apparatus which is susceptible of a low cost of manufacture with regard to both materials and labor, and which accordingly is then susceptible of low prices of sale to the consuming public, thereby making such multi-purpose trailer apparatus economically available to the buying public.

Still yet another object of the present invention is to provide a new and improved multi-purpose trailer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the invention to further include snow skid members arranged for selective use relative to the wheel of the trailer structure.

FIG. 8 is an orthographic view, taken along the lines 8—8 of FIG. 7 in the direction indicated by the arrows.

DESCRIPTION OF THE PREFERRED EMBODIMENT

Figure 1:
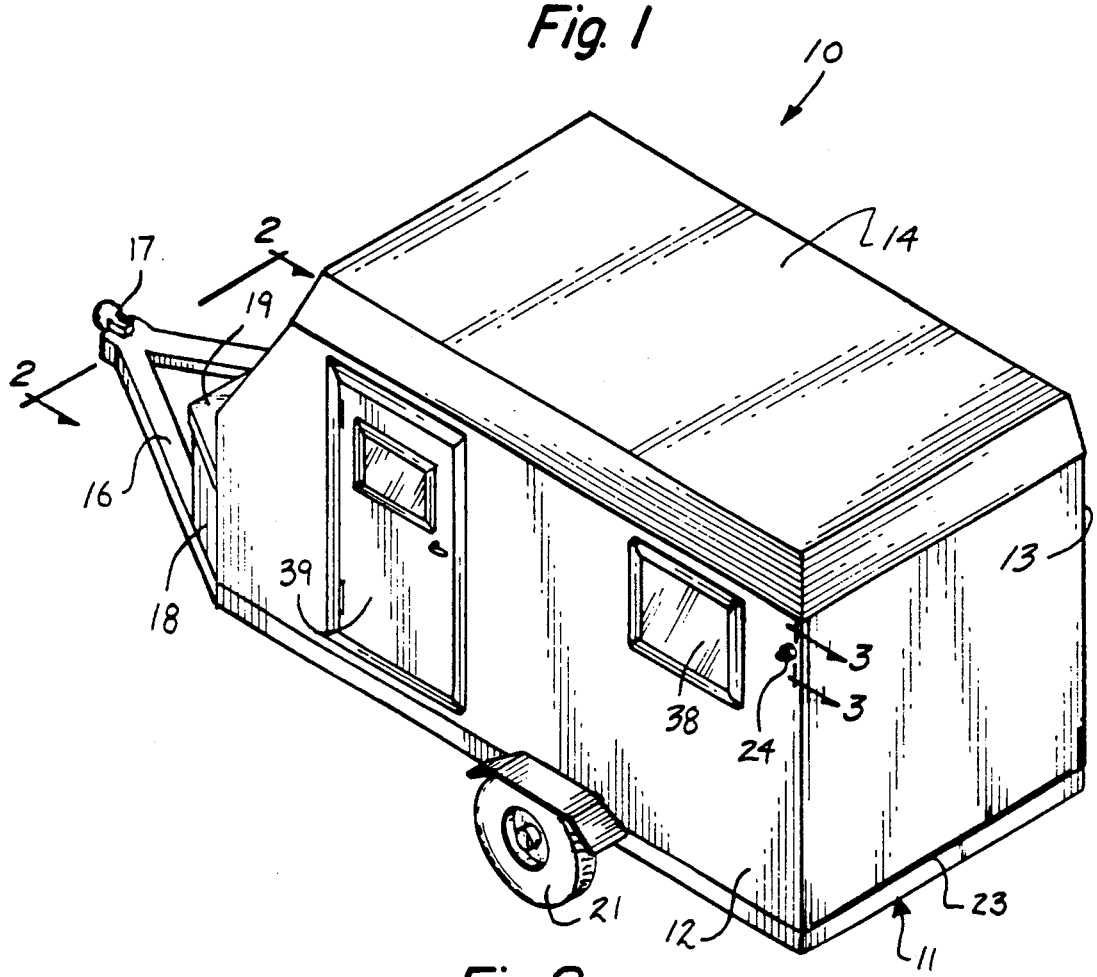
FIG. 1 is an isometric illustration of the invention.

With reference now to the drawings, and in particular to FIGS. 1 to 8 thereof, a new and improved multi-purpose trailer apparatus embodying the principles and concepts of the present invention and generally designated by the reference numeral 10 will be described.

Figure 5:
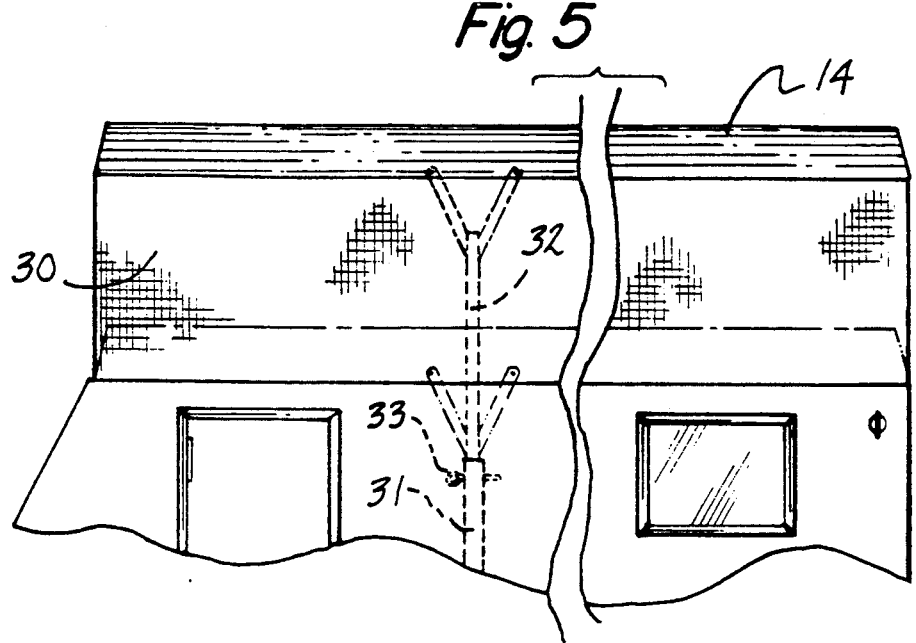
FIG. 5 is an orthographic side view of the trailer indicating the roof dome arranged for lifting having a surrounding unitary side wall mounted to a lower periphery of the roof dome.

More specifically, the multi-purpose trailer apparatus 10 of the invention essentially comprises a rigid rectilinear frame assembly 11 mounted thereon a trailer housing, to include a first side wall 12 and a second side wall 13 arranged in a parallel coextensive relationship relative to one another and orthogonally mounted to the frame assembly 11, wherein the rectilinear frame assembly 11 includes a triangulated forward frame portion 16 extending forwardly and orthogonally relative to a front wall 15 of the trailer housing. A roof dome 14 is mounted to the side walls and the front wall, wherein the roof dome, such as indicated in FIG. 5 for example, is arranged for telescoping projection above the side walls and front wall for use with the organization as a temporary dwelling, in a manner to be discussed in more detail below. A trailer hitch socket 17 is mounted to an apex of the triangulated forward portion 16 for mounting to a tow vehicle.

A container 18 is mounted to the front wall 15 and to the triangulated forward portion 16 for maintaining geometric integrity of the container 18 mounted to the organization, wherein the container 18 includes a container lid 19 permitting access within the container for storage of various components therewithin.

Figure 2:
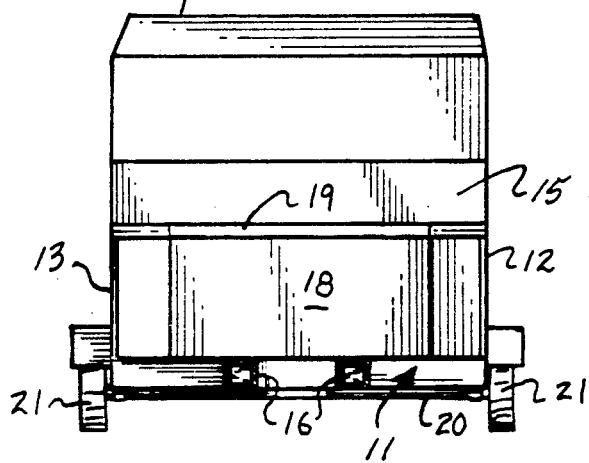
FIG. 2 is an orthographic view, taken along the lines 2—2 of FIG. 1 in the direction indicated by the arrows.
Figure 4:
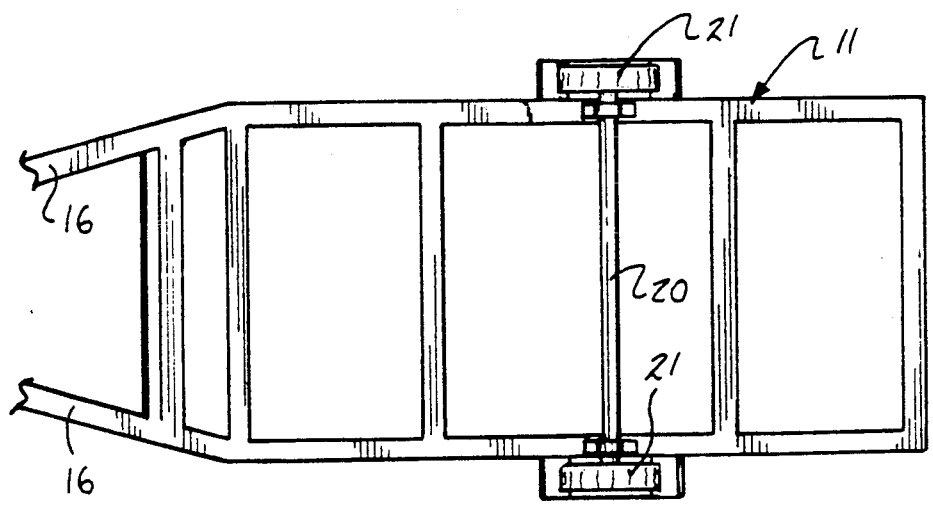
FIG. 4 is an orthographic top view of the invention.

Reference to the FIGS. 2 and 4 for example includes an axle 20 mounted below the rectilinear frame assembly 11 and extending laterally therebeyond and includes wheel members 21 rotatably mounted to each end of the axle 20.

Figure 6:
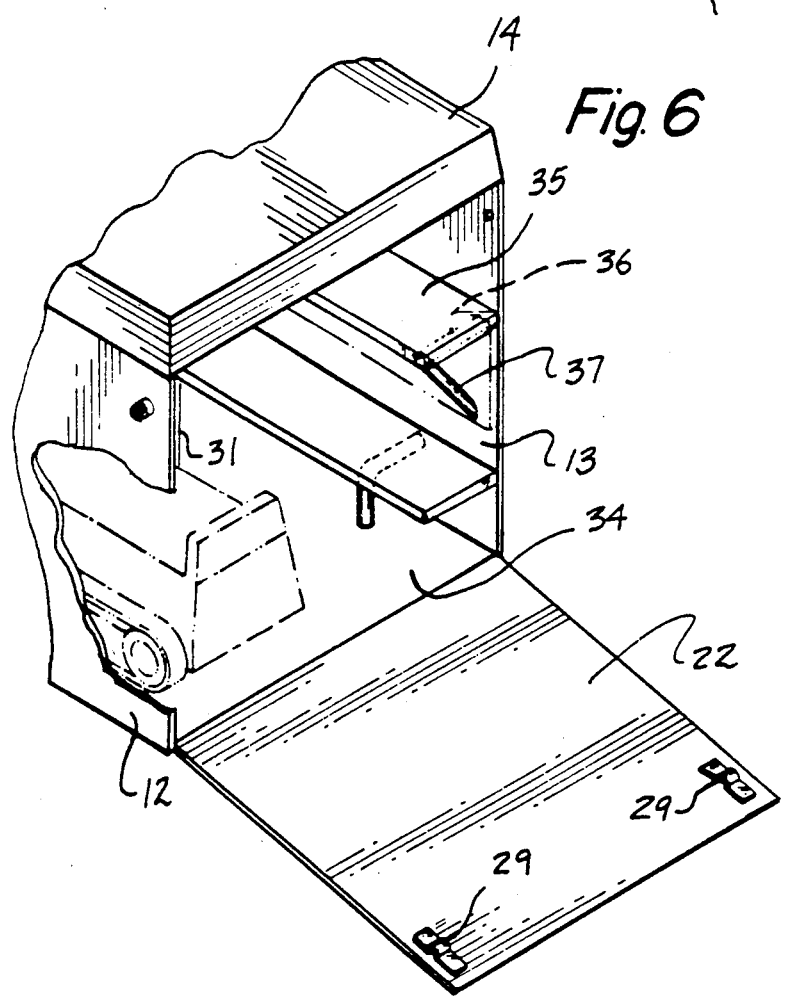
FIG. 6 is an isometric rear view of the trailer structure.

Further, a rear wall door 22 extends coextensively and orthogonally between the first and second side walls 12 and 13 and includes a rear wall door hinge 23 mounted simultaneously to the rear wall door 22 and to the rectilinear frame assembly 11 to permit pivoting of the rear wall door 22 relative to the trailer housing and for simultaneous use of the rear wall door 22 as a ramp to permit projection and positioning of various storage components such as snowmobiles within the trailer housing, in a manner as indicated in FIG. 6.

Figure 3:
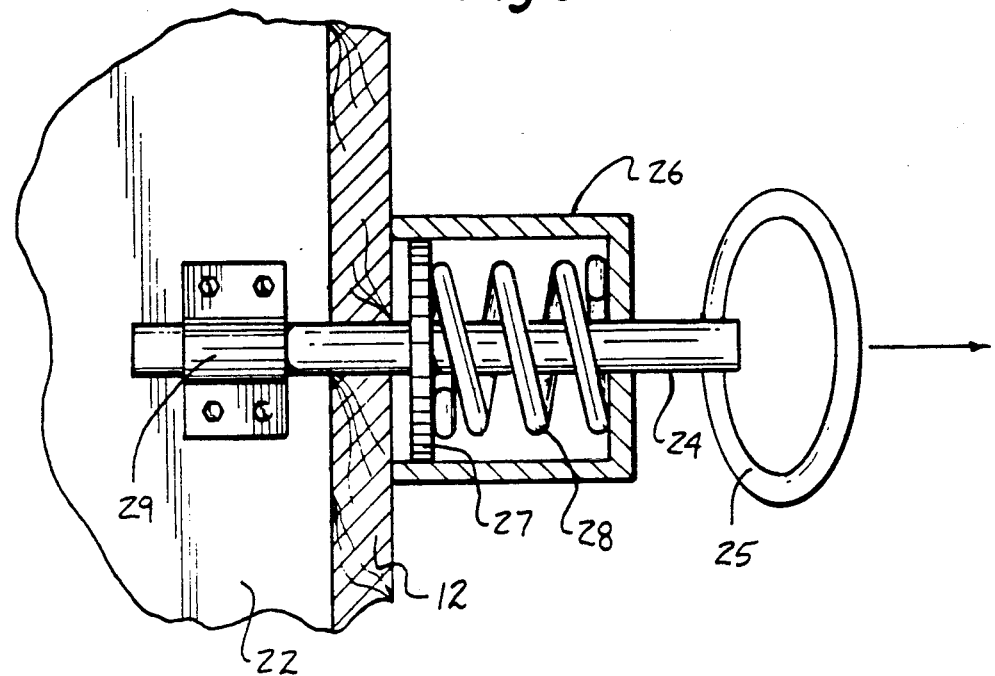
FIG. 3 is an orthographic view, taken along the lines 3—3 of FIG. 1 in the direction indicated by the arrows.

With reference to the FIGS. 1, 3, and 6, at least one latch rod 24 is orthogonally and reciprocatably mounted relative to one of the side walls, such as the first side wall 12, in adjacency to the rear wall door 22. The latch rod 24 includes a latch rod handle 25 positioned exteriorly of the first side wall 12, with the latch rod 24 mounted slidably and medially of the latch rod housing 26, that in turn is fixedly secured to the first side wall 12. The latch rod 24 includes an abutment plate 27 mounted fixedly to the latch rod in adjacency to the first side wall door within the housing 26 to provide for a spring member 28 captured between the abutment plate 27 and the housing 26 to bias the latch rod within the trailer housing, and more specifically to be received within a securement loop 29 mounted to the rear wall door 22. A plurality of such securement loops 29, such as indicated in FIG. 6, may be employed with a latch rod 24 and associated structure, such as noted above, mounted reciprocatably through each of the first and second side walls 12 and 13 in adjacency to the rear wall door 22.

As illustrated in FIG. 5, the roof dome 14 includes a unitary flexible roof dome side wall 30 mounted to a continuous lower periphery of the roof wall dome 14 and to the first and second side walls 12 and 13, as well as the front wall 15, whereupon the roof dome 14 is mounted to a telescoping leg 32 that in turn is telescopingly received within a support rod 31 mounted within the trailer housing and typically mounted as desired to the trailer housing floor plate 34. A lock pin 33 is arranged for mounting between the support rod 31 and telescoping leg 32 to provide for projection of the telescoping leg 32 in a locked manner relative to the support rod 31 to effect for the spaced orientation of the roof dome 14 relative to the trailer housing side walls, front wall, and rear wall door 22 to assist in employment of the structure as a temporary dwelling. Further it should be noted that at least one support shelf 35 is mounted for example to a second side wall 13 within the trailer housing, wherein the support shelf 35 includes a recess 36 mounted to a bottom surface of the support shelf 35 to receive a support leg 37 that in turn is pivotally mounted to the support shelf 35 to provide for positioning of the support shelf 35 in a flush orientation relative to an interior surface of the second side wall 13, as indicated in phantom in FIG. 6. Further, at least one window 38 and a door 39 is provided such as mounted to the first side wall 12, as illustrated in FIG. 1 for example.

With reference to FIG. 7 indicates the use of a semi-cylindrical pocket 43 mounted to each exterior surface of the side walls 12 and 13, in a manner as indicated in FIG. 7, to receive a respective wheel member 21 therewithin when the wheel member is removed relative to the axle 20. A protective axle cap 40 is then mounted to the free distal end of the axle, wherein a plurality of snow skids 41 are mounted below each side of the rectilinear frame assembly 11 in alignment below a respective side wall, wherein the snow skids 41 relative to each side wall are arranged in a longitudinally aligned relationship and may include a sheath cladding 42 such as formed of TEFLON. In this manner, the use of the organization for transport through snow country in a more convenient manner is afforded.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-purpose trailer apparatus, comprising, a rectilinear frame assembly, having a trailer housing fixedly mounted to the frame assembly, wherein the trailer housing includes a first side wall spaced from, parallel to, and coextensive with a second side wall, with the first side wall and the second side wall fixedly mounted to the frame assembly, and a front wall fixedly mounted to the first side wall and the second side wall extending between the first side wall and the second side wall, and a roof dome positioned upon the first side wall, the second side wall, and the front wall, and the frame assembly including a triangulated forward frame portion extending from the rectilinear frame assembly and the front wall terminating in a trailer hitch socket at an apex of the triangulated forward frame portion, and a rear wall door oriented coextensively between the first side wall and the second side wall, and a rear wall door hinge mounted to the rear wall door and to the rectilinear frame assembly permitting pivoting of the rear wall door relative to the frame assembly, and an axle fixedly mounted to the frame assembly below the trailer housing, with the axle including an axle first end extending beyond the first side wall, and an axle second end extending beyond the second side wall, with the axle orthogonally oriented relative to the first side wall and the second side wall, and a wheel member mounted to the axle first end and a further wheel member mounted to the second end in a rotatable relationship, and at least one latch rod, wherein the at least one latch rod includes a latch rod handle, and a latch rod housing fixedly mounted to the first side wall in adjacency to the rear wall door, and the latch rod including an abutment plate fixedly mounted to the latch rod within the latch rod housing in adjacency to the first side wall, and a spring captured between the latch rod abutment plate and the housing to bias the latch rod within the trailer housing, and a securement loop fixedly mounted to the rear wall door in adjacency to the first side wall to slidably receive the latch rod therethrough, and the roof dome includes a unitary flexible roof dome side wall, wherein the roof dome includes a lower periphery of continuous configuration and the roof dome side wall is mounted to the lower periphery, and the roof dome further mounted to the first side wall, the second side wall, and the front wall, with the roof dome having a telescoping leg fixedly mounted to the roof dome within the trailer housing, and a support rod, the trailer housing having a trailer floor plate and the support rod fixedly mounted to the trailer floor plate receiving the telescoping leg slidably therewithin, and lock means arranged for securement of the telescoping leg in a predetermined extended orientation relative to the support rod within the trailer housing.

* * * * *